2,793,207
STEROIDAL THIAZOLE DERIVATIVES

Jack W. Ralls, Morton Grove, and Clarence G. Bergstrom, Chicago, Ill., assignors, by mesne assignments, to G. D. Searle & Co., Skokie, Ill., a corporation of Delaware No Drawing. Application November 1, 1954, Serial No. 466,214

8 Claims. (Cl. 260—239.5)

The present invention relates to a new group of steroidal thiazole derivatives and, more specifically, to thiazoles containing attached to their carbon-4, the carbon-17 of a steroid nucleus. The compounds of our invention can be represented by the general structural formula

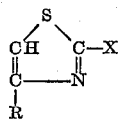

wherein X is a hydroxy, mercapto or amino radical, and R is a steroid radical attached to the thiazole ring through its carbon-17.

Of special interest are the compounds wherein R is an oxygenated androsten-17-yl radical such as a 3-oxo-4-androsten-17-yl radical, a 3-hydroxy-5-androsten-17-yl radical, a 3-(lower alkanoyloxy)-5-androsten-17-yl radical such as a 3-acetoxy-5-androsten-17-yl radical, a 3-benzoyloxy-5-androsten-17-yl radical, a 3-oxo-17-hydroxy-4-androsten-17-yl radical, a 3,11-dioxo-17-hydroxy-4-androsten-17-yl radical and the like.

The compounds of our invention are conveniently prepared from the corresponding steroids containing attached to the 17-position a β-haloacetyl radical.

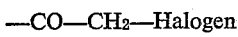

The preparation of these 17β-haloacetyl compounds can be accomplished by the methods indicated in the literature. We have indicated a preferred process for their synthesis in the examples below. In this process the corresponding 17-(β-hydroxyacetyl) compound is treated with a large excess of benzenesulfonyl halide, e. g. benzenesulfonyl chloride, preferably 10 to 30 mols, and 1 mol of pyridine or a lower alkylated pyridine derivative such as 2,4,6-collidine. By allowing this reaction to proceed for a sufficient amount of time the benezesulfonate formed in the process is cleaved with formation of the 21-halo compound.

The synthesis of the 2-aminothiazoles of our invention is conveniently conducted by heating the haloacetyl steroid with thiourea. Among the suitable solvents for this reaction are the lower alkanones such as acetone and butanone. The 2-aminothiazoles form salts with a variety of inorganic and strong organic acids including the hydrohalic acids, sulfuric, phosphoric, sulfamic, citric, ascorbic and related acids.

Treatment of the 17-(β-haloacetyl)-steroids with ammonium dithiocarbamate yields the claimed 2-mercaptothiazoles. Typical suitable solvents are ethanol and acetone.

Reaction of the 17-(β-haloacetyl)-steroids with barium thiocyanate yields the 17-(β-thiocyanoacetyl)-steroid which, on treatment with concentrated hydrochloric acid, undergoes cyclization to form the 2-hydroxythiazole.

The compounds of our invention are valuable medicinal agents especially because of their valuable digitalis-like regulatory effect on cardiac arrhythmia. They also are hypotensive agents and have a specific progesterone-like inhibitory effect on the release of pituitary gonadotrophin.

The following examples illustrate in detail certain of the thiazoles which constitute this invention and methods for their preparation. However, our invention is not to be construed as limited thereby in spirit or in scope, since it will be apparent to organic chemists that many modifications in materials and methods can be practiced without departing from the scope of this invention. In these examples temperatures are given in degrees centigrade (° C.) and relative amounts of materials in parts by weight.

This application is a continuation in part of our copending application, Serial No. 381,118, filed September 18, 1953, now abandoned.

Example 1

A dry, nitrogen-filled vessel is charged with 18.2 parts of 21-hydroxy-4-pregnene-3,20-dione, 6.4 parts of collidine and 200 parts of benzenesulfonyl chloride. The mixture is stirred mechanically for 4 hours and then allowed to stand at 37–39° C. for an additional 20 hours. The contents of the vessel are dissolved in 5000 parts of a 5% solution of ethyl acetate in benzene. This solution is poured into a chromatography column prepared from 1820 parts of silica gel. After washing the column with three 5000 part portions of a 5% solution of ethyl acetate in benzene, the 21-chloro-4-pregnene-3,20-dione is eluted with one 5000 part portion of a 5% solution of ethyl acetate in benzene and two 5000 part portions of a 10% solution of ethyl acetate in benzene. Evaporation of the eluate under vacuum yields the 21-chloro compound melting at about 202–205° C. It is crystallized from benzene and ether. The rotation of a chloroform solution a $[\alpha]_D = 211°$. The ultraviolet spectrum of a methanolic solution shows a maximum at 241 millimicrons with a molecular extinction coefficient of 17,000.

Example 2

A suspension of 5.72 parts of 17,21α-dihydroxy-4-pregnene-3,20-dione in 60 parts of freshly distilled benzenesulfonyl chloride is treated with 3.84 parts of 2,4,6-collidine and the mixture is swirled occasionally for 24 hours, while the temperature is maintained at about 25° C. The reaction mixture is diluted with 1425 parts of benzene and 75 parts of ethyl acetate and poured into a chromatography column containing 540 parts of silica gel. After washing off the benzenesulfonyl chloride with several 1500 part portions of a 5% solution of ethyl acetate in benzene, the product is eluted with 10% and 20% solutions of ethyl acetate in benzene. The pure 21-chloro-17α-hydroxy-4-pregnene-3,20-dione melts at about 253–259° C. (yellow melt) after crystallization from a mixture of chloroform and ether. The infrared absorption spectrum shows maxima at 2.88, 5.82, and 6.12 microns.

Example 3

A mixture of 100 parts of 11β,17α,21-trihydroxy-4-pregnene-3,20-dione, 32 parts of 2,4,6-collidine and 1380 parts of benzenesulfonyl chloride is stirred with a stream of nitrogen bubbles and maintained at a temperature of 40° C. After 23 hours the reaction mixture is transferred to a silica gel column and the benzenesulfonyl chloride is eluted with a 19:1 mixture of benzene and ethyl acetate. Elution of the column with 3:1, 2:1 and 1:1 mixtures of benzene and ethyl acetate and repeated recrystallization of the residue from acetone yields 21-chloro-11β,17α-dihydroxy-4-pregnene-3,20-dione which melts at about 232–237° C.

Example 4

A mixture of 100 parts of 17α,21-dihydroxy-4-pregnene-3,11,20-trione, 68 parts of 2,4,6-collidine and 1380 parts of benzenesulfonyl chloride is stirred at 44° C. for 24 hours. The reaction mixture is transferred to a silica gel column. Excess benzenesulfonyl chloride is eluted with a 5% solution of ethyl acetate in benzene after which the chloride is eluted with a 33% solution of ethyl acetate in benzene. Evaporation of the eluting solvent yields the 21-chloro-17α-hydroxy-4-pregnene-3,11,20-trione which, recrystallized from dioxane, melts at about 258–263° C. with decomposition. The ultraviolet absorption spectrum, as determined in a 4:1 mixture of methanol and dioxane, shows a maximum at 238 millimicrons with a molecular extinction coefficient of 15,900.

*Example 5*

A solution of 10 parts of 21-chloro-4-pregnene-3,20-dione in 1000 parts of acetone is treated with 30 parts of thiourea. The turbid solution is heated under reflux for 3 hours. A solid precipitate forms which is collected on a filter. It consists of the hydrochloride of 2-amino-4-(3'-oxo-4'-androsten-17'-yl)thiazole which melts with decomposition at about 290° C. The filtrate is again heated under reflux for an additional 2 hours. The reaction mixture is poured into water and the solid precipitate is collected on a filter and dried. Recrystallized from aqueous methanol, the 2-amino-4-(3'-oxo-4'-androsten-17'-yl)thiazole melts at about 254° C. The specific rotation of a methanol solution is $[\alpha]_D = +81°$. The ultraviolet absorption spectrum shows a maximum at 242 millimicrons with a molecular extinction coefficient of 21,300. The compound has the structural formula

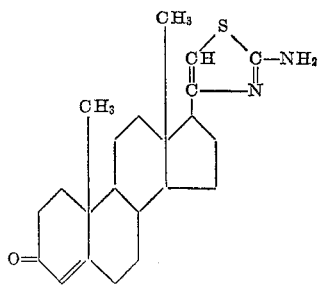

In the same manner, refluxing of a butanone solution of 1 part of 21-chloro-11β,17α-dihydroxy-4-pregnene-3,20-dione with 3 parts of thiourea yields the 2-amino-4-(3'-oxo-11β,17α-dihydroxy-4'-androsten-17'-yl)-thiazole of the structural formula

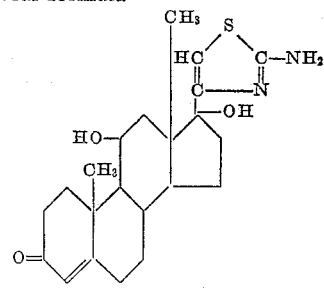

Also, reaction of an acetone solution of 1 part of 21-chloro-17α-hydroxy-4-pregnene-3,20-dione with 3 parts of thiourea by the method of the foregoing example yields the 2-amino-4-(3'-oxo-17α-hydroxy-4'-androsten-17'-yl)-thiazole of the structural formula

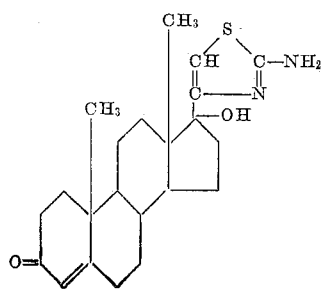

*Example 6*

Ammonia is passed into 100 parts of ethanol until 8.5 parts have been taken up. 59 parts of the resulting solution are mixed with 66 parts of 95% ethanol and 12 parts of carbon disulfide are added. The suspension is allowed to stand at room temperature for 20 hours after which it is stirred at room temperature and a solution of 3 parts of 21-chloro-4-pregnene-3,20-dione in 300 parts of acetone is added dropwise over a 3 hour period. The reaction mixture is stirred at room temperature for 2 hours and then heated under reflux for 3 hours. The pale orange-colored solution is diluted with 200 parts of 3-N hydrochloric acid and allowed to stand overnight. The pale yellow solid which forms is collected by filtration and washed with water. Crystallized from a mixture of chloroform and acetone, the 2-mercapto-4-(3'-oxo-4'-androsten-17'-yl)thiazole melts at about 295° C. with decomposition. The infrared absorption spectrum shows maxima of strong intensity at 3.8, 6.08, 6.93, and 9.45 microns, maxima of medium intensity at 3.26, 7.55, and 8.12 microns, and maxima of weak intensity at 8.48, 10.45, and 11.32 microns. The product has the structural formula

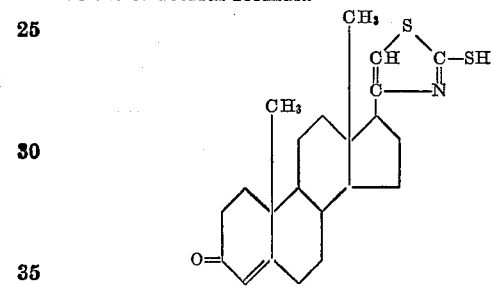

By substituting for the 21-chloro-4-pregnene-3,20-dione an equivalent amount of 21-chloro-17α-hydroxy-4-pregnene-3,11,20-trione, there is obtained the high-melting 2-mercapto-4-(3'-11'-dioxo-17α-hydroxy-4'-androsten-17'-yl)-thiazole which has the structural formula

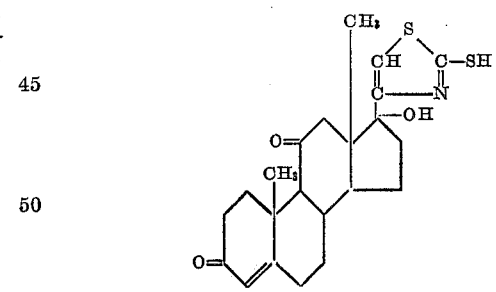

*Example 7*

A solution of 168 parts of barium perchlorate in 400 parts of water is mixed with a solution of 97 parts of potassium thiocyanate in 100 parts of water. The suspension is cooled for several hours, and the precipitated potassium perchlorate is removed by filtration. The resulting solution, containing 126 parts of barium thiocyanate in 500 parts of water, is added to a solution of 36 parts of 21-chloro-4-pregnene-3,20-dione in 2400 parts of acetone. The solution is heated under reflux for 4 hours. The clear solution is diluted with 2000 parts of warm water and, after cooling to room temperature, the product is collected on a filter and washed with a large volume of water. Crystallization from ethyl acetate yields 21-thiocyano-4-pregnene-3,20-dione melting at about 175° C. The specific rotation of a chloroform solution is $[\alpha]_D = +175°$. The ultraviolet absorption spectrum of a methanolic solution shows a maximum at 241 millimicrons with an extinction coefficient of 17,300. The infrared absorption spectrum shows a strong maximum at 5.98 microns, a maximum of intermediate intensity at 5.82 and 6.22 microns, and weak maxima at 4.25 and 7.28 microns. The compound has the structural formula

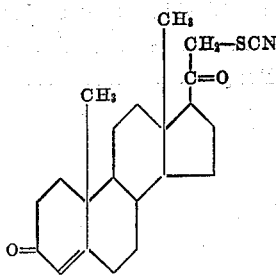

A solution of 43 parts of 21-thiocyano-4-pregnene-3,20-dione in 5000 parts of 2-propanol is heated to boiling and then treated by dropwise addition with 600 parts of concentrated aqueous hydrochloric acid. The clear solution is heated under reflux for 2½ hours and the resulting mixture is poured into water and extracted with chloroform. The extract is washed with water, dilute sodium bicarbonate solution, and water and then dried over anhydrous sodium sulfate, filtered and evaporated. Trituration of the crude material yields 2-hydroxy-4-(3'-oxo-4'-androsten-17'-yl)-thiazole melting at about 275° C. with decomposition. The ultraviolet absorption spectrum of a methanolic solution has a maximum at 242 millimicrons with a molecular extinction coefficient of 20,700. The infrared absorption spectrum shows a strong maximum at 6.05 microns, and maxima of intermediate intensity at 3.12, 6.95, and 8.12 microns. The compound has the structural formula

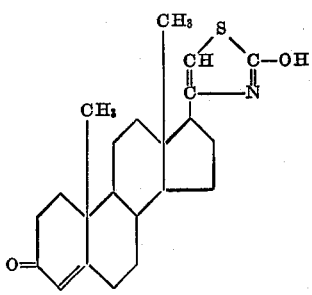

Substitution of one equivalent of 21-iodo-20-oxo-5-pregnen-3-ol for the 21-chloro-4-pregnene-3,20-dione yields the 2-hydroxy-4-(3'-hydroxy-5'-androsten-17'-yl)-thiazole which has the structural formula

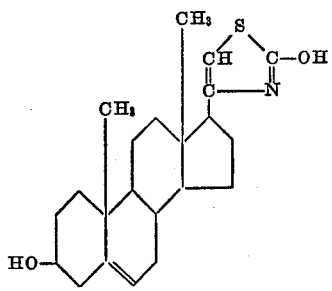

What is claimed is:
1. A compound of the structural formula

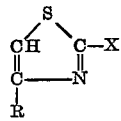

wherein X is a member of the class consisting of OH, SH and NH₂ radicals and R is a member of the class consisting of 3-hydroxy-5-androsten-17-yl and 4-androsten-17-yl radicals containing a member of the class consisting of oxo and hydroxy radicals in at least one of the positions 3, 11 and 17.

2. A compound of the structural formula

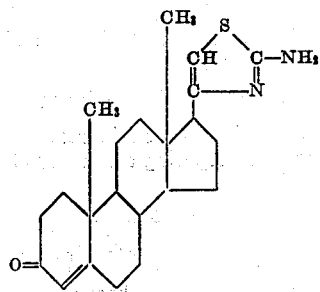

3. A compound of the structural formula

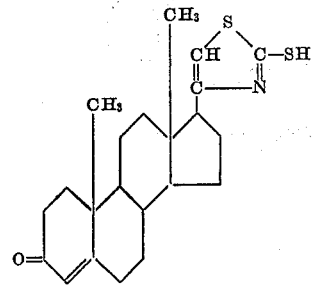

4. A compound of the structural formula

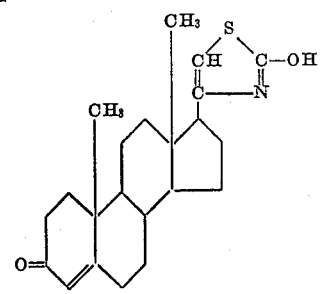

5. A compound of the structural formula

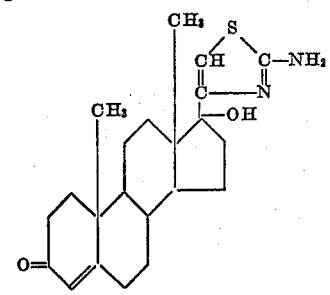

6. A compound of the structural formula

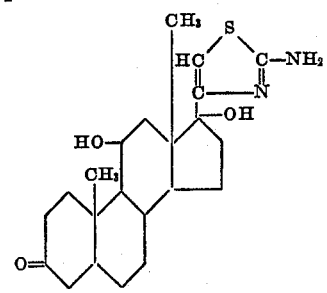

7. The process of preparing a compound of the structural formula

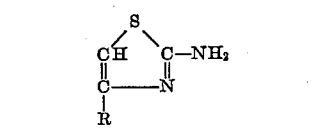

wherein R is a member of the class consisting of 3-hydroxy - 5 - androsten - 17 - yl and 4 - androsten - 17 - yl radicals containing a member of the class consisting of oxo and hydroxy radicals in at least one of the positions 3, 11 and 17, which comprises the heating of a compound of the structural formula

R—CO—CH₂—Halogen with at least one equivalent of thiourea.

8. The process of preparing a compound of the structural formula

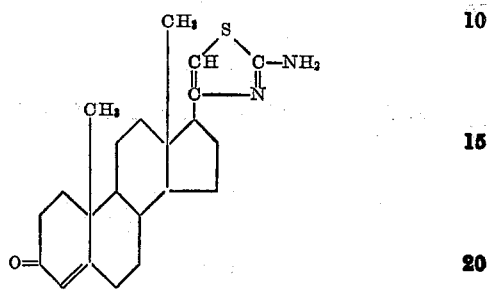

which comprises the heating of a 21-halo-4-pregnene-3,20-dione with at least one equivalent of thiourea.

References Cited in the file of this patent

UNITED STATES PATENTS 2,664,423   Rong _____ Dec. 29, 1953